July 3, 1973     L. J. TREW     3,743,691
PURIFICATION OF STRONTIUM CARBONATE
Filed June 21, 1971
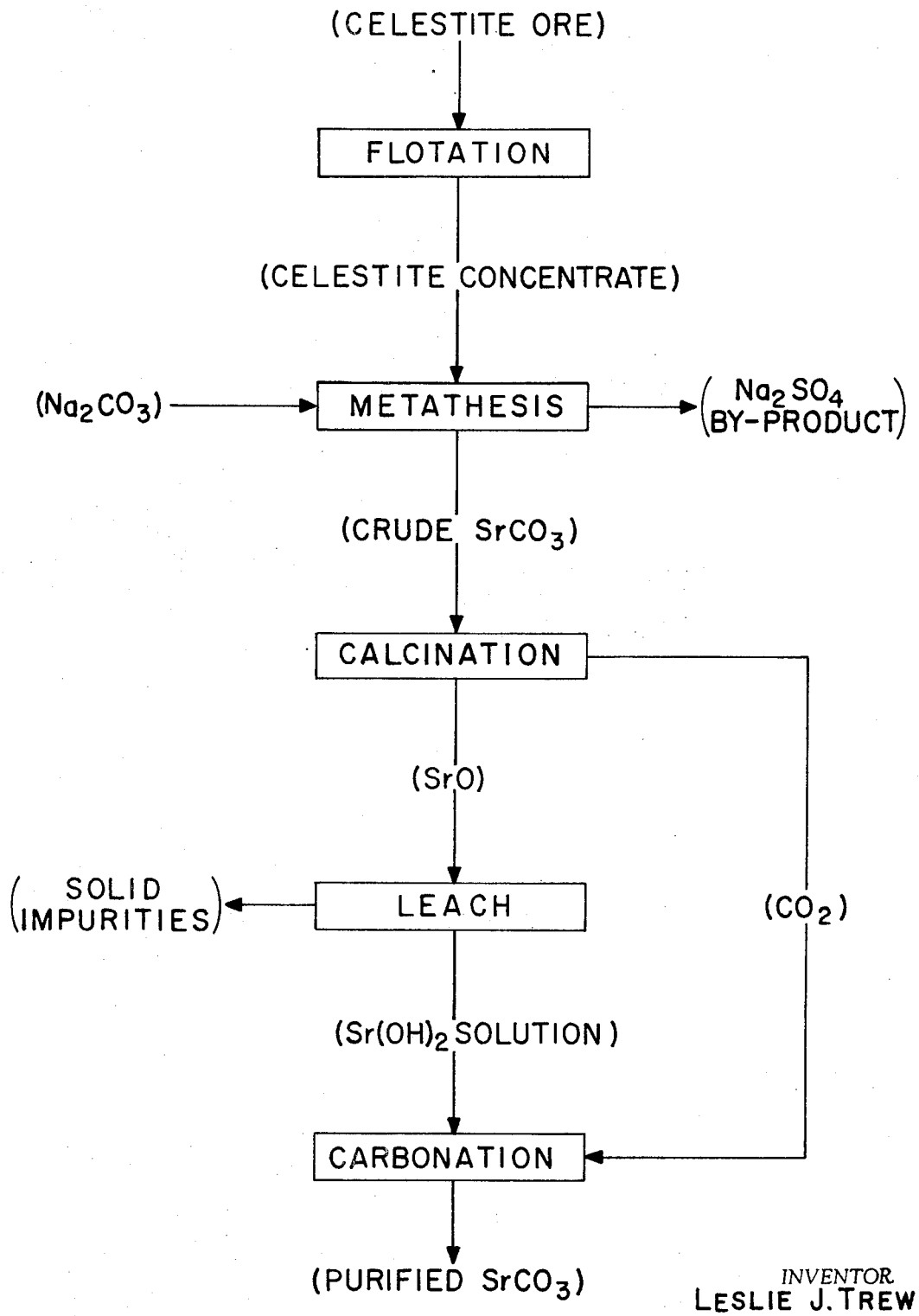
INVENTOR
LESLIE J. TREW
BY
*Malcolm McInnis*
ATTORNEY United States Patent Office 3,743,691
Patented July 3, 1973

3,743,691
PURIFICATION OF STRONTIUM CARBONATE
Leslie J. Trew, Moraga, Calif., assignor to Kaiser Aluminum & Chemical Corporation, Oakland, Calif.
Filed June 21, 1971, Ser. No. 155,115
Int. Cl. C01b 11/18; C22b 3/00
U.S. Cl. 423—165
15 Claims

ABSTRACT OF THE DISCLOSURE

Strontium carbonate is purified by calcination to produce strontium oxide, the latter being hydrated to form strontium hydroxide which is dissolved in excess water. After removal of solid impurities, the strontium hydroxide solution is carbonated to precipitate purified strontium carbonate. This method of purification can be applied to a strontium carbonate produced by metathesis of a beneficiated strontium sulfate (celestite) ore.

BACKGROUND OF THE INVENTION

Strontium carbonate is used as a raw material for ceramic magnets, and also for making glass, particularly glass for use in television tubes, where low transmittivity of X-rays is desired. Other strontium compounds, which can be produced from the carbonate, find use in pyrotechnics, and in the chemical, paint, and pharmaceutical industries.

When, as is usually the case, strontium carbonate is produced from natural ores, the main problem is beneficiating or purifying the natural materials to achieve the requisite degree of purity in the final product. Because of its chemical similarity to strontium, barium is particularly difficult to remove. Iron is another element which is difficult to remove particularly when it occurs as hematite inclusions. When the ore body comprises a strontium compound other than the carbonate, for example strontium sulfate in celestite ores, it is also necessary to convert this other compound to strontium carbonate.

The presently used commercial process for producing strontium carbonate from celestite ores is the so-called "black ash" process wherein strontium sulfate is mixed with finely divided carbon and the mixture calcined at a temperature of about 1000° C. to produce strontium sulfide (SrS), carbon dioxide ($CO_2$), and carbon monoxide (CO). Strontium sulfide is soluble in water and is accordingly leached from the calcination product, the solid impurities being removed by settling and filtration. Strontium sulfide is converted to the carbonate by carbonation, either with sodium carbonate ($Na_2CO_3$) or carbon dioxide or both. When sodium carbonate is used, sodium sulfide ($Na_2S$) is produced as a by-product, whereas when carbon dioxide is used the by-product is hydrogen sulfide ($H_2S$), which can be further processed to produce sulfuric acid or elemental sulfur. If both sodium carbonate and carbon dioxide are used in the carbonation, the by-product is sodium hydrosulfide (NaHS).

Although the "black ash" process has proved commercially successful, it has certain disadvantages. For one thing, the process produces undesirable pollutant by-products, particularly hydrogen sulfide. Also, there is little market for sodium sulfide, and therefore its production creates a waste disposal problem.

It is also known to convert strontium sulfate to strontium carbonate directly by a metathesis reaction wherein strontium sulfate is added to a solution of sodium carbonate to produce strontium carbonate and leave sodium sulfate in solution. However, this method has the disadvantage that very little purification takes place during the process. In other words, it is possible to produce by the black ash process a product containing over 95% by weight strontium carbonate from an ore, which may have been beneficiated, containing only 85% or less by weight strontium sulfate. On the other hand, to produce a product containing over 95% by weight strontium carbonate by the metathesis reaction requires that the strontium sulfate fed to the reaction contain about 95% by weight $SrSO_4$. Thus, the metathesis method requires a greater degree of beneficiation for the ore used than does the black ash process.

The process of this invention overcomes several disadvantages of prior art processes in that it avoids the pollution and undesirable by-products of the black ash process, while at the same time producing a strontium carbonate of even higher purity. It also permits the use of the metathesis reaction with ores of lower purity.

SUMMARY OF THE INVENTION

According to this invention, strontium carbonate is purified by (a) calcining the strontium carbonate to be purified to produce strontium oxide;

(b) hydrating the strontium oxide produced in step (a) to produce strontium hydroxide;

(c) dissolving substantially all the strontium hydroxide produced in step (b) in water;

(d) separating any insoluble material from the solution of strontium hydroxide produced in step (c); and (e) carbonating the strontium hydroxide solution clarified in step (d) to precipitate strontium carbonate.

BRIEF DESCRIPTION OF THE DRAWING

The drawing is a flow sheet of one embodiment of the process of this invention, certain preliminary steps for the production of crude strontium carbonate being included to show one way in which material for use in the process of this invention can be prepared.

DETAILED DESCRIPTION

Calcination of the crude strontium carbonate is carried out in an oxidizing atmosphere at a temperature of at least 1200° C., and preferably not higher than 1500° C. A calcination time of about 30 minutes at temperature has been found satisfactory, although longer or shorter times may be used. While any suitable furnace can be used for calcination, a rotary kiln has proved to be an effective and economic means. Alternatively, a fluid bed furnace might be used. The precise calcination temperature will be chosen on the basis of the impurities present in the crude strontium carbonate. For example, barium carbonate or sulfate and calcium carbonate are common impurities in most strontium carbonates. The decomposition temperature of calcium carbonate is below, whereas the decomposition temperatures of barium carbonate and barium sulfate are above, that of strontium carbonate. Accordingly, calcination at higher temperatures tends to produce more barium oxide which will be leached along with the strontium oxide and hence contaminate the final product. To the extent that the barium sulfate or carbonate are not decomposed, they will be removed in the leaching step along with the other solid impurities. On the other hand, although calcium carbonate decomposes during the calcination, the higher the calcination temperature the more inert will be the calcium oxide produced. The more inert the calcium oxide, the less it will be leached from the calcination product along with the strontium oxide. However, in any case, the solubility of CaO in water at about 100° C. is very low compared to that of strontium hydroxide.

Preferably, the crude strontium carbonate used in the process of this invention contains at least 80% $SrCO_3$, although ores of lower strontium content can be used. In addition, the siilca ($SiO_2$) content of the crude strontium carbonate should be as low as possible since, during calcination, each mole of $SiO_2$ combines with at least 2 moles of SrO to form distrontium or tristrontium silicate, removing a substantial amount of strontium from the final product. Thus, for example, in one test a crude strontium carbonate containing 1.3% $SiO_2$ showed a recovery, using the method of this invention, of 95% by weight of the SrO values in the feed, whereas with a similar crude strontium carbonate containing 5.1% $SiO_2$, only 65% by weight of the SrO values in the feed were recovered in the product.

Hydration of the calcination product to form strontium hydroxide and the dissolution of this material in excess water can advantageously be carried out simultaneously by leaching the calcination product with excess water. Preferably such leaching is carried out with strontium oxide which substantially all passes a 20 mesh screen and at a temperature above 90° C., most preferably as close to the boiling point of water as practical, because the solubility of strontium hydroxide in water drops rapidly as the temperature of the solution drops below 100° C. It has been found that if the concentration of $Sr(OH)_2$ in the leach solution is kept high, at least 8%, and up to 12%, by weight, the amount of $Ca(OH)_2$ in the solution is minimized.

After the leaching step, the hot strontium hydroxide solution is thickened and filtered to remove solid material, which constitutes most of the impurities in the crude strontium carbonate. These may include alumina, silica, iron, and barium to the extent that it is present as sulfate or carbonate. Apparently the iron originally in the celestite emerges from the kiln as insoluble calcium ferrite. Calcium is also removed as unhydrated calcium oxide, as previously discussed, and also as calcium hydroxide, which has a very low solubiity in water compared to the solubility of $Sr(OH)_2$.

Carbonation of the strontium hydroxide solution can be carried out by any suitable means, for example by reaction with sodium carbonate, but the use of carbon dioxide has been found quite effective. More specifically, carbonation can be carried out with carbon dioxide recovered from the gaseous exhaust of the calcination operation, particularly when calcination is carried out in a rotary kiln. Waste gases from the kiln contain not only carbon dioxide from the decomposed strontium carbonate, but also carbon dioxide produced by combustion of fuel used to heat the kiln. It will be understood that waste gases from the kiln will be passed through dust collectors and scrubbers to remove and recover entrained solids and clean the gas for use in the carbonation. It has been found that best results are obtained when the carbonation is carried out in the presence of strontium carbonate seed material. In other words, a certain amount, for example two-thirds, of the purified strontium carbonate product is recycled to the carbonation step to provide seed crystals on which further strontium carbonate can precipitate, thus producing a relatively coarse, filterable product.

The crude strontium carbonate used in the process of this invention may be produced by any suitable means. However, a particularly suitable method of preparation has been found to be the metathesis reaction described above. Preferably the metathesis is carried out at a temperature of at least 90° C. in a water solution about 1.8 molar in sodium carbonate and most preferably with from 1% to 5% mole percent excess sodium carbonate over the stoichiometric amount required to react with the strontium sulfate present. It has been found that the metathesis proceeds, under these conditions, to substantial completion (i.e., less than 2 weight percent $SO_3$ content in the crude strontium carbonate) in about 16 hours using —150 mesh concentrate. It has also been found that with higher or lower concentrations than 1.8 molar sodium carbonate, the extent of reaction, after a given time, is less than for a 1.8 molar solution.

The solid product of the metathesis, mainly strontium carbonate, is removed by settling and filtration and provides the crude strontium carbonate for use in the process of this invention. The sodium sulfate produced in solution by the metathesis can be separately removed as a valuable by-product.

As discussed above, the metathesis reaction effects little beneficiation of the strontium values in the raw material used. Accordingly, since naturally occurring strontium ores containing as much as 80% strontium sulfate are scarce, it will usually be necessary to beneficiate such ores, preferably to a level of at least 80% by weight strontium sulfate, before subjecting them to the metathesis step. Such beneficiation can be carried out by any of several known methods, for example by acid leaching, heavy media separation, or froth flotation. The use of flotation on an ore milled to at least —150 mesh, and preferably to —325 mesh, has proved particularly effective in carrying out the method of the present invention in conjunction with the metathesis conversion of the sulfate ore to the carbonate.

Strontium carbonate produced by the method of the present invention can be used directly or, if desired, can be converted to other strontium compounds. For example, it can be converted to strontium nitrate by reaction with nitric acid. Alternatively, $Sr(NO_3)_2$, $SrCrO_4$, $SrCl_2$, and other salts, may be produced by evaporating the $Sr(OH)_2$ solution after neutralization by nitric, chromic, hydrochloric, or other appropriate acid. Strontium octahydrate $(Sr(OH)_2 \cdot 8H_2O)$ may be produced by evaporation of the $Sr(OH)_2$ solution.

It is among the advantages of the present method that by it there is produced a strontium carbonate of higher purity, particularly lower barium content, than that produced by other methods, while at the same time producing a valuable by-product, sodium sulfate, all without producing undesirable pollutants, and at the same time offering great flexibility in the choice of final strontium product.

It will be understood that the flow sheet in the figure represents an outline of a particularly preferred process incorporating the purification process of this invention, and that only the principal products and by-products have been indicated. Thus, for example, specification of the particular impurities removed at various stages has been omitted in the interests of clarity.

EXAMPLE

As an example of the practice of this invention, a Nova Scotia celestite ore was milled to pass a 150 mesh screen and subjected to froth flotation. The crude ore contained about 50% celestite, about 33% clays and quartz, about 12% calcite and dolomite, about 3% hematite and traces of galena, sphalerite, pyrite and barite. The ore showed the following average chemical analysis on an oxide basis: 27.5% SrO, 24.0% $SO_3$, 4.4% CaO, 2.7% $Fe_2O_3$, 24.3% $SiO_2$, 5.4% $Al_2O_3$, 1.0% $K_2O$, 0.5% BaO, 0.2% Pb, and 0.04% Zn, the remainder being $CO_2$ and $H_2O$. After flotation, the beneficiated ore showed the following analysis: 90.1% $SrSO_4$, 3.5% $CaCO_3$, 2.8% $Al_2O_3$, 1.6% $BaSO_4$, 1.5% $SiO_2$, and 0.5% $Fe_2O_3$. The great reduction in the silica content of the ore should be noted.

The beneficiated ore was reacted with a 1.8 molar aqueous solution of sodium carbonate at 95° C., the amount of reactants being controlled so that there were 1.02 moles of sodium carbonate for each mole of strontium sulfate in the beneficiated ore. The mixture fed to the metathesis reaction contained 22% solids by weight.

After a reaction time of at least 12 hours, the solid metathesis product was settled, rinsed, centrifuged, and fed to a rotary kiln. The crude strontium carbonate recovered from the metathesis showed the following chemical analysis: 86% $SrCO_3$, 2.7% $SrSO_4$, 6.9% $CaCO_3$, 0.9% $BaCO_3$, 0.9% $BaSO_4$, 1.5% $SiO_2$, 0.8% $Na_2O$ and 0.3% $Fe_2O_3$, all percentages being by weight based on the total weight of the solid product. The sodium sulfate containing solution was processed through evaporators and crystallizers to produce solid $Na_2SO_4$.

The kiln had a maximum temperature of 1350° C. The rate of feed and rotation of the kiln were controlled so that the material passing through the kiln was maintained at this temperature for about 30 minutes. About 7000 lb./hr. of solids were discharged from the kiln.

The material discharged from the lower end of the rotary kiln passed directly into quenching and leaching tanks with water at a temperature of 95° C. About 6400 lb. of water were used to leach each 1000 lb. of solids discharged from the kiln. After an average retention time in the leaching tank of about 2 hours, the resulting suspension was thickened, the overflow going to a polishing filter to remove very fine suspended solids, and the underflow to a basket centrifuge where it was washed to recover essentially all the soluble strontium. The clear filtrate was passed to carbonation tanks where about 3000 lb./hr. of carbon dioxide, recovered from the rotary kiln, was bubbled through the solution as it was agitated mechanically. About three-fourths of the resulting strontium carbonate slurry from the carbonating tanks was returned to these tanks to provide seed material.

The strontium carbonate slurry was filtered to about 50% solids, blended with −150 mesh recycled $SrCO_3$ to about 15% moisture, and extruded. It was then dried at a temperature of about 150° C. to produce coherent particles, milled, screened to remove particles which would not pass a 28 mesh screen, and air classified to remove particles finer than 150 mesh. The +28 mesh particles were further milled and recycled to the screening operation, while the −150 mesh material was recycled to the circuit prior to the dryer, as described.

The final product showed the following typical chemical analysis: 99% $SrCO_3$, 0.7% $BaCO_3$, 0.1% $CaCO_3$, 0.05% $Na_2CO_3$, 0.2% $SO_3$, plus trace amounts (less than 0.01%) of $Fe_2O_3$, $Cr_2O_3$, CoO, NiO, MgO, MnO, and $Al_2O_3$.

What is claimed is:
1. Method of purifying strontium carbonate comprising
   (a) calcining a strontium carbonate containing at least 80% by weight $SrCO_3$ and not over 1.5% by weight $SiO_2$ at a temperature of from 1200 to 1500° C. in an oxidizing atmosphere to produce strontium oxide;
   (b) hydrating the strontium oxide produced in step (a) to produce strontium hydroxide;
   (c) dissolving substantially all the strontium hydroxide produced in step (b) in excess water at a temperature above 90° C. to produce a solution containing at least 8% by weight $Sr(OH)_2$;
   (d) separating any insoluble material from the solution of strontium hydroxide produced in step (c); and
   (e) carbonating the strontium hydroxide solution clarified in step (d) in the presence of strontium carbonate seed material to precipitate strontium carbonate.
2. Method according to claim 1 wherein the strontium carbonate to be purified is calcined in finely divided form.
3. Method according to claim 1 wherein the calcination is carried out in a rotary kiln.
4. Method according to claim 1 wherein the strontium oxide hydrated in step (b) substantially all passes a 20 mesh screen.
5. Method according to claim 1 wherein the hydration of step (b) and the dissolution of step (c) are carried out simultaneously by hydrating the strontium oxide produced in step (a) with sufficient excess water to dissolve substantially all the strontium hydroxide produced.
6. Method according to claim 1 wherein the carbonation of step (e) is carried out with carbon dioxide.
7. Method according to claim 6 wherein said carbon dioxide has been recovered from the calcination of step (a).
8. Method according to claim 1 wherein the strontium carbonate to be purified is produced by reacting an ore containing at least 80% by weight strontium sulfate with sodium carbonate in aqueous solution to form solid strontium carbonate, and separating the solid strontium carbonate from the aqueous solution.
9. Method according to claim 8 wherein the reaction between strontium sulfate and sodium carbonate is carried out at a temperature of at least 90° C.
10. Method according to claim 8 wherein the reaction between strontium sulfate and sodium carbonate is carried out in the presence of from 1 to 5 mole percent excess sodium carbonate over the stoichiometric amount required to react with the strontium sulfate present.
11. Method according to claim 8 wherein the sodium carbonate solution is about 1.8 molar.
12. Method according to claim 8 wherein the strontium sulfate is a beneficiated celestite ore.
13. Method according to claim 12 wherein the celestite ore has been beneficiated by flotation.
14. Method according to claim 13 wherein the reaction between strontium sulfate and sodium carbonate is carried out at a temperature of at least 90° C. and in the presence of from 1 to 5 mole percent excess sodium carbonate over the stoichiometric amount required to react with the strontium sulfate present, wherein the strontium carbonate to be purified substantially all passes a 150 mesh screen, wherein the calcination is carried out in a rotary kiln, wherein the strontium oxide to be hydrated substantially all passes a 20 mesh screen and the hydration and dissolution steps are carried out simultaneously by adding sufficient excess water to the strontium oxide produced in step (a) to dissolve substantially all the strontium hydroxide produced, and wherein the carbonation is carried out with carbon dioxide recovered from the calcination of step (a).
15. Method according to claim 14 wherein the sodium carbonate solution is about 1.8 molar.

References Cited
UNITED STATES PATENTS

| | | | |
|---|---|---|---|
| 280,172 | 6/1883 | Grouven | 23—186 |
| 647,320 | 4/1900 | Newberry | 23—186 |
| 1,067,595 | 7/1913 | Ekstrom | 23—186 |
| 1,782,830 | 11/1930 | Pierce | 23—186 |

FOREIGN PATENTS

| | | | |
|---|---|---|---|
| 346,404 | 4/1931 | Great Britain | 23—186 |

OTHER REFERENCES

Sobolev: "Mineral'noe Syre'e" 5 (No. 7–8), 1107–13 (1930).

OSCAR R. VERTIZ, Primary Examiner

J. COOPER, JR., Assistant Examiner

U.S. Cl. X.R.

423—432